Patented June 18, 1935

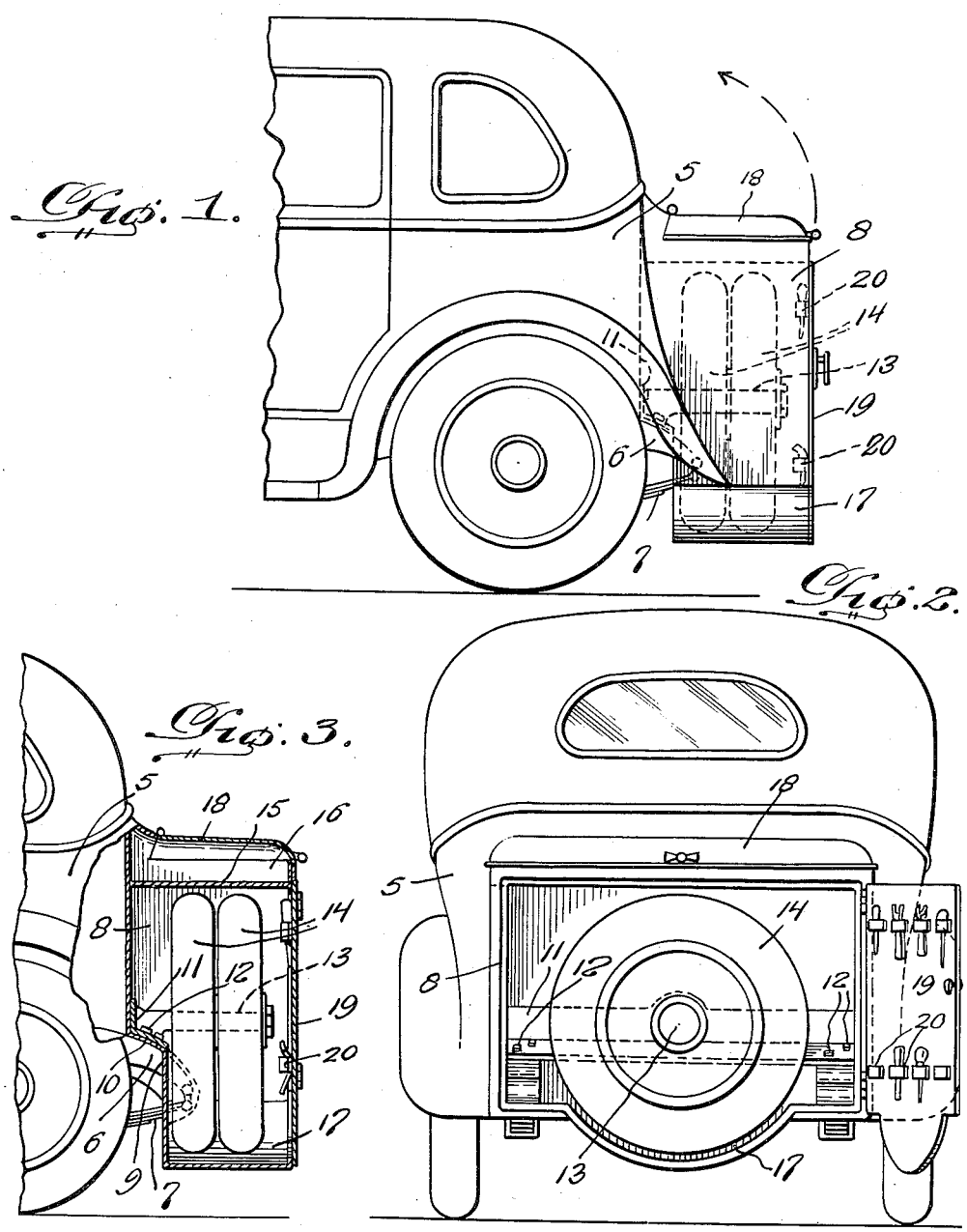

2,005,604

UNITED STATES PATENT OFFICE 2,005,604

TOOL CHEST AND SPARE WHEEL CARRIER FOR AUTOMOBILES

Emily Thrine, Battle Creek, Mich.

Application May 9, 1933, Serial No. 670,158

1 Claim. (Cl. 296—37)

This invention relates to a combined tool chest and spare wheel carrier for automobiles, the object of the invention being to provide a simple and efficient construction whereby tools and other articles may be carried so as to be readily accessible, and whereby extra or spare wheels may be effectively carried and housed from the elements in a readily accessible manner.

More specifically, the present invention contemplates the provision of a combined tool chest and spare wheel carrier including a suitable receptacle built on the rear of the automobile body so as to form a rearward extension thereof and to enhance the appearance of the automobile, efficient means being provided for mounting a plurality of spare wheels within the lower portion of the receptacle, and other means being provided to facilitate the carrying of tools and other articles within the receptacle for convenient access.

Other objects and features of the invention will become apparent from the following description when considered in connection with the accompanying drawing, and the invention consists in the novel form, combination and arrangement of parts hereinafter more fully described, shown in the drawing, and claimed.

In the drawing:

Figure 1 is a fragmentary side elevational view showing the rear portion of an automobile with a tool chest and spare wheel carrier built thereon in accordance with the present invention.

Figure 2 is a rear elevational view of the construction shown in Figure 1 with the rear door of the tool chest and spare wheel carrier in open position; and Figure 3 is a view somewhat similar to Figure 1 with the receptacle forming part of the present invention, in vertical longitudinal section.

Referring in detail to the drawing, 5 indicates the body of a conventional automobile having a chassis whose side frame members 6 project rearwardly for connection with the rear ends of the rear springs 7 in a well known manner. Built on the rear of the body 5 during the manufacture of the automobile is a receptacle 8 forming part of the combined tool chest and spare wheel carrier constituting the present invention. In building the receptacle on the rear of the body 5, the upper front wall portion of the receptacle 8 constitutes part of the rear wall of the automobile body 5 and the side walls of receptacle 8 extend from the rear wall of the automobile body 5 so that said receptacle constitutes a rearward extension of the automobile body and may be conveniently designed to enhance the appearance of the automobile.

It will be noted that the lower portion of receptacle 8 is offset rearwardly as at 9 to provide a narrow horizontal wall portion 10 arranged to rest upon the rearwardly projecting ends of the side frame member 6 of the automobile. Secured upon the substantially horizontal wall portion 10 and engaging the rear wall portion of receptacle 8 directly thereabove is an angular plate 11 that extends clear across the back of receptacle 8 and is secured at its ends by riveting or bolting as at 12 through the wall portion 10 and the projecting rear ends of the side frame members 6 of the automobile. Rigid with and projecting rearwardly from the plate 11 intermediate the ends of the latter and within the lower portion of receptacle 8 is a shaft or like support 13 of a conventional type adapted to removably carry a plurality of spare vehicle wheels 14. As the plate 11 is of angular form in cross section and rigidly secured to the side frame members 6 of the automobile, a durable construction of spare wheel carrier is provided in which the load of the spare wheels is carried by the vehicle frame rather than a wall of the receptacle 8.

The receptatcle 8 is divided by a horizontal partition 15 into an upper shallow compartment 16 and the lower relatively deep compartment 17 which accommodates the spare wheels 14. The top of receptacle 8 is provided with a hinged lid 18 for permitting convenient access to the compartment 16, wherein may be carried various articles such as a pump, a jack, and other accessories or parts. The rear of compartment 17 is closed by a horizontally swinging door 19 upon the inner face of which may be provided a number of different tool-supporting brackets or holders 20, thus permitting the tools to be carried in an orderly manner and in a conveniently accessible position. When the door 19 is closed, the spare wheels and tools will be effectively housed in the lower compartment 17 of the receptatcle 8 so as to be effectively protected from the elements, but access to the tools or the spare wheels may be readily had for removal thereof upon opening the door 19.

From the foregoing description, it is believed that the construction, advantages and manner of using the present invention will be readily understood and appreciated by those skilled in the art. The receptacle 8 may be made of the same material and finished in the same manner as the body 5 of the automobile. A simple and efficient construction is thereby had which will be sightly in appearance. Minor changes are contemplated within the spirit and scope of the invention as claimed.

What I claim as new is:

In combination with an automobile, a tool chest and spare wheel carrier including a receptacle built on the rear of the automobile body as an integral rearward extension thereof and with the upper front wall of the receptacle constituting part of the rear wall of the automobile body, the lower front portion of said receptacle being offset rearwardly to provide a substantially horizontal front wall portion resting upon the side frame members of the automobile chassis, an angular plate extending across the receptacle against the front wall of the latter at the offset and secured at its ends upon the side frame members of the automobile chassis, a spare wheel supporting shaft rigid with and projecting rearwardly from said angular plate intermediate its ends and within the receptacle, and a door for the rear of said receptacle permitting access to and removal of the spare wheels carried by said supporting shaft.

EMILY THRINE.